(12) United States Patent
Khazen et al.

(10) Patent No.: US 11,609,390 B2
(45) Date of Patent: Mar. 21, 2023

(54) OPTICAL SPLITTING ADAPTOR

(71) Applicant: Mellanox Technologies, Ltd., Yokneam (IL)

(72) Inventors: Nimer Khazen, Bu'ayna Village (IL); Alon Rokach, Haifa (IL)

(73) Assignee: Mellanox Technologies, Ltd., Yokneam (IL)

(*) Notice: Subject to any disclaimer, the term of this patent is extended or adjusted under 35 U.S.C. 154(b) by 0 days.

(21) Appl. No.: 17/162,471

(22) Filed: Jan. 29, 2021

(65) Prior Publication Data
US 2022/0244471 A1 Aug. 4, 2022

(51) Int. Cl.
*G02B 6/40* (2006.01)
*G02B 6/38* (2006.01)

(52) U.S. Cl.
CPC .......... *G02B 6/406* (2013.01); *G02B 6/3825* (2013.01); *G02B 6/3885* (2013.01); *G02B 6/3893* (2013.01)

(58) Field of Classification Search
None
See application file for complete search history.

(56) References Cited

U.S. PATENT DOCUMENTS

| 8,485,737 | B2* | 7/2013 | Kolesar | G02B 6/28 |
| | | | | 385/24 |
| 11,099,337 | B2* | 8/2021 | Bradley | G02B 6/448 |
| 2015/0331192 | A1* | 11/2015 | Hall | G02B 6/3885 |
| | | | | 385/24 |

OTHER PUBLICATIONS

Ninomiya, Tiger "Specification for CS Connector". SENKO Advanced Components, Rev 1.1, [retrieved from internet], <URL:https://www.gigalight.com/datasheet/cs-connector-specification.pdf>, dated Mar. 11, 2019.
"Fibre Optic Interconnecting Devices and Passive Components—Fibre Optic Connector Interfaces", International Standard, Edition 2.0, [retrieved from Internet], <URL:https://webstore.ansi.org/Standards/IEC/IEC61754 20Ed2012?gclid=EAIaIQobChMI_IG83NnY7gIVRf3jBx135w_HEAAYASAAEgJML_D_BwE>, dated (Apr. 2012).

* cited by examiner

*Primary Examiner* — Omar R Rojas
(74) *Attorney, Agent, or Firm* — Moore & Van Allen PLLC; Michael M. McCraw

(57) ABSTRACT

Optical splitting adaptors and associated methods of manufacturing are provided. An example optical splitting adaptor includes a first connector housing that interfaces with a first optical transceiver having a first data rate, and the first connector housing accommodates a first type multi-fiber ferrule of a first number of fibers. The example optical splitting adaptor also includes a second connector housing that defines dual receptacles for interfacing with a second optical transceiver and a third optical transceiver, and the dual receptacles receive respective multi-fiber ferrules. The example optical splitting adaptor further includes a plurality of fibers operably connecting the first connector housing and the second connector housing such that, in operation, the plurality of fibers perform optical splitting between the first type multi-fiber ferrule of the first connector housing and the multi-fiber ferrules received by the dual receptacles of the second connector housing.

20 Claims, 10 Drawing Sheets

OPTICAL SPLITTING ADAPTOR

TECHNOLOGICAL FIELD

Example embodiments of the present disclosure relate generally to communications systems and, more particularly, to networking adaptors for interfacing between optical fiber links.

BACKGROUND

Datacenters and other networking environments may include connections between switch systems, servers, racks, and other devices in order to provide for signal transmission between one or more of these elements. Such connections may be made using cables, transceivers, networking boxes, modules, printed circuit boards (PCBs), and connector assemblies, each of which may have a different size, shape, form factor, or the like as defined by applicable regulations or standards. Applicant has identified a number of deficiencies and problems associated with conventional networking communication systems. Through applied effort, ingenuity, and innovation, many of these identified problems have been solved by developing solutions that are included in embodiments of the present disclosure, many examples of which are described in detail herein.

BRIEF SUMMARY

Apparatuses, systems, and associated methods of manufacturing are provided for optical splitting adaptors. An example optical splitting adaptor may include a first connector housing configured to interface with a first optical transceiver having a first data rate, wherein the first connector housing is configured to accommodate a first type multi-fiber ferrule of a first number of fibers. The optical splitting adaptor may include a second connector housing defining dual receptacles configured to interface with a second optical transceiver and a third optical transceiver, wherein each of the dual receptacles is configured to receive respective multi-fiber ferrules. The optical splitting adaptor may further include a plurality of fibers operably connecting the first connector housing and the second connector housing such that, in operation, the plurality of fibers is configured to perform optical splitting between the first type multi-fiber ferrule of the first connector housing and the multi-fiber ferrules received by the dual receptacles of the second connector housing.

In some embodiments, the plurality of fibers further includes a first bundle of fibers and a second bundle of fibers extending between the first type multi-fiber ferrule and one of the dual receptacles, and a third bundle of fibers and a fourth bundle of fibers extending between the first type multi-fiber ferrule and the other of the dual receptacles.

In some embodiments, a portion of the plurality of fibers is configured for data transmission and a portion of the plurality of the fibers is configured for data reception.

In some embodiments, the second connector housing includes a multi-fiber push on (MPO) connector.

In some embodiments, each of the multi-fiber ferrules is a mechanical transfer (MT) ferrule.

In some embodiments, the first connector housing includes a female connector configured to receive the first type multi-fiber ferrule of the first optical transceiver.

In other embodiments, the first connector housing includes a male connector supporting the first type multi-fiber ferrule configured to be received by the first optical transceiver.

In some embodiments, each of the dual receptacles is configured to receive a second type multi-fiber ferrule of a second number of fibers. In such an embodiment, the first type multi-fiber ferrule may include a mechanical transfer 16 (MT16) ferrule, and the second type multi-fiber ferrules may each include a mechanical transfer 12 (MT12) ferrule.

In some embodiments, the first optical transceiver may include an Ethernet optical transceiver, and each of the second optical transceiver and the third optical transceiver may include an InfiniBand® optical transceiver. In such an embodiment, each of the dual receptacles of the second connector housing may be configured to receive a male multi-fiber push on (MPO) connector of an optical cable communicably coupled with respective InfiniBand® optical transceivers.

In some further embodiments, the first connector housing further may include a male MPO connector configured to be received by a corresponding female optical interface of the Ethernet optical transceiver.

In other further embodiments, the first connector housing may include a female MPO receptacle configured to receive a male MPO connector of an optical cable communicably coupled with the Ethernet optical transceiver.

In any embodiment, the second optical transceiver may be configured to operate at a second data rate and the third optical transceiver may be configured to operate as a third data rate. In such an embodiment, the second data rate and/or the third data rate may be the same as the first data rate.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1:
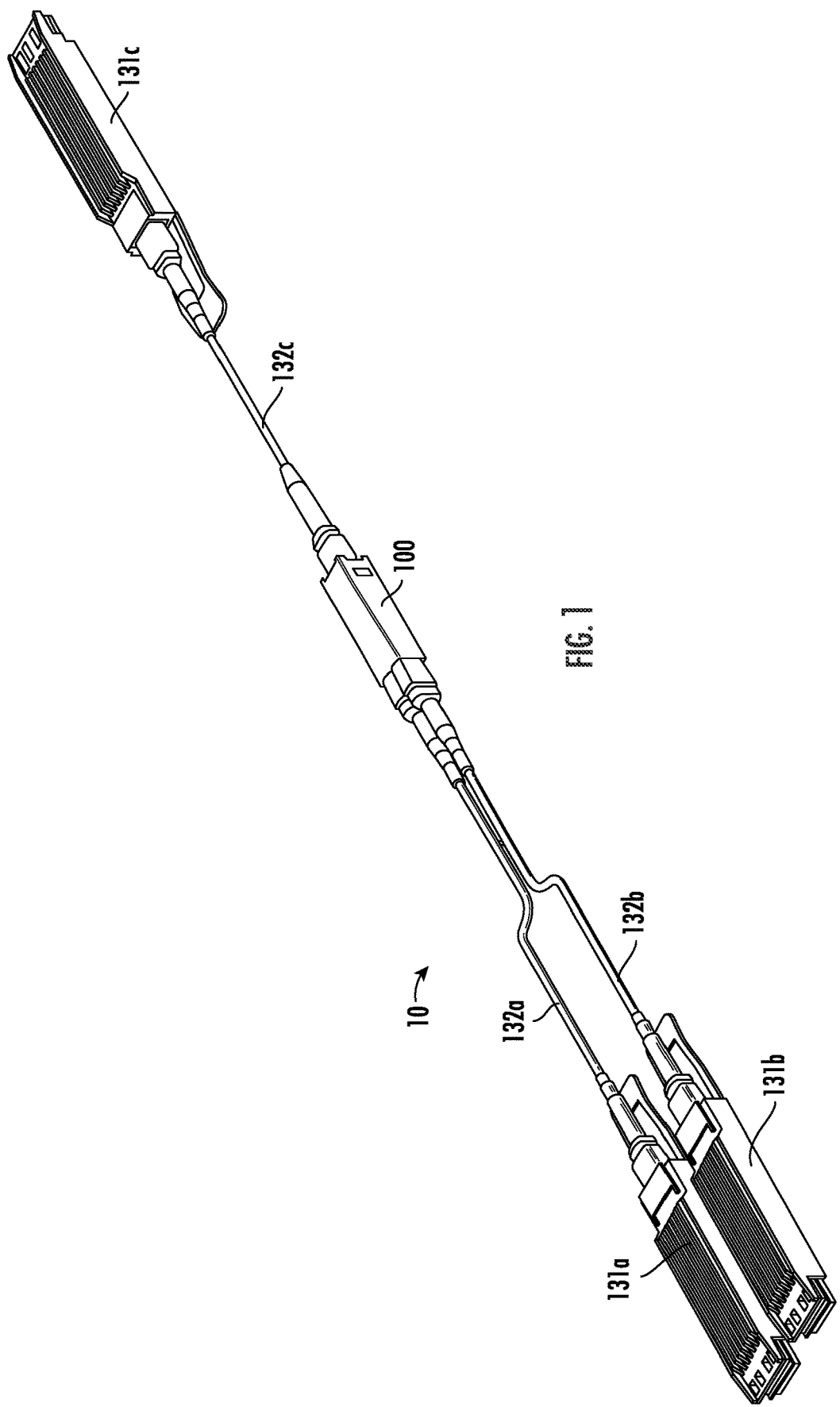
FIG. 1 illustrates an example networking connection including an optical splitting adapter defining a female connector in accordance with some embodiments described herein.
Figure 2:
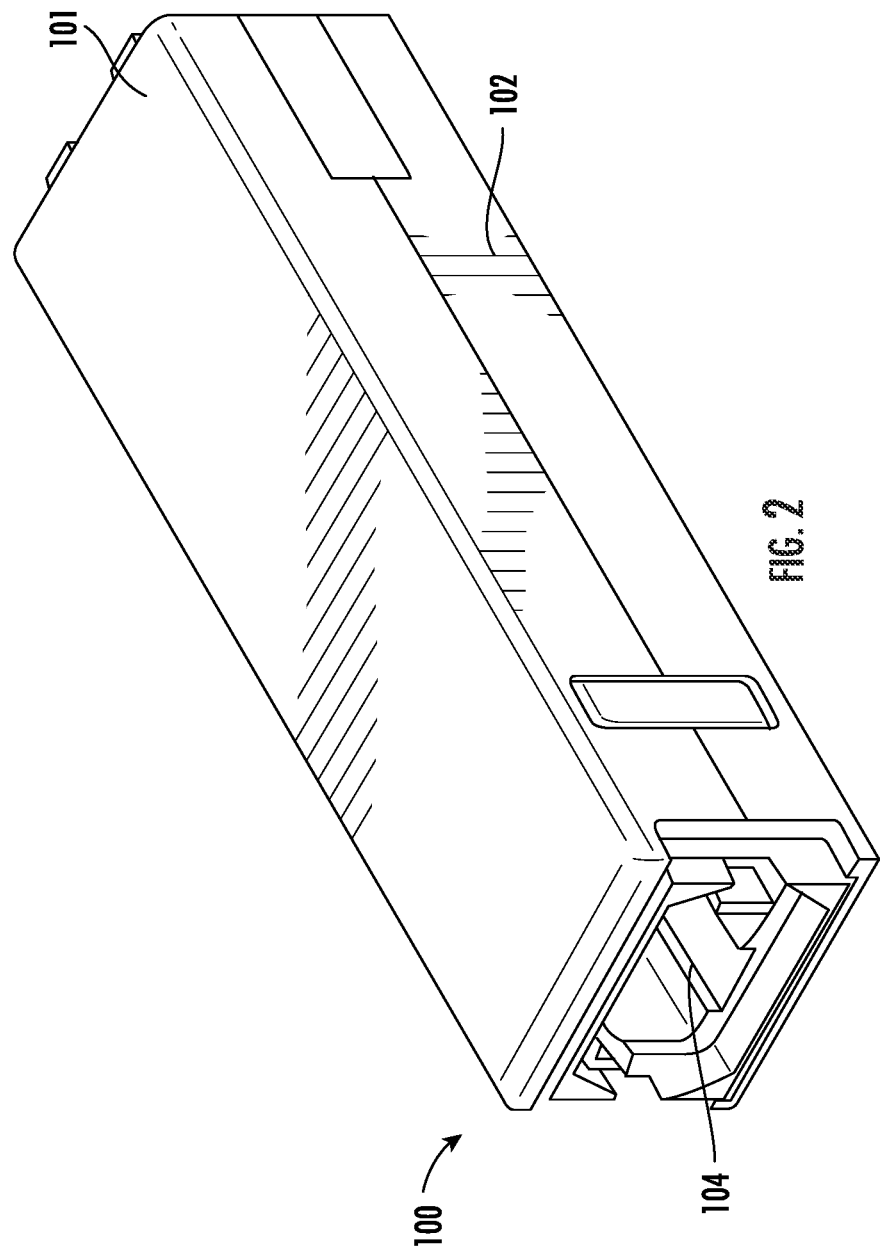
FIG. 2 illustrates a perspective exterior view of the optical splitting adapter of FIG. 1 in accordance with some embodiments described herein.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As described above, datacenters, networking environments, and other communication systems may include connections between switch systems, servers, racks, and other devices in order to provide for signal transmission between one or more of these elements. For example, optical communications systems may employ various networking cables, modules, connectors, and the like to enable data flow between system components that are governed by applicable regulations or standards. By way of a particular example, InfiniBand® and Ethernet are standards used in high-performance computing that regulate networking connections having high bandwidth, for example 400 Gbit/s. The InfiniBand® standard is often relevant for communications links between processors and I/O devices, and the Ethernet standard is often relevant for communication links in local area networks (LAN), metropolitan area networks (MAN), and wide area networks (WAN).

To provide connection between devices in either standard, MT (Mechanical Transfer) connectors and associated MT ferrules may be used. These MT connectors may include alignment mechanisms defining, for example, two (2) stainless steel guide pins that fit into precisely molded alignment holes. Such an MT connector may also be used as a fiber interface for Multi-fiber Push On (MPO) connectors. These MPO connectors may include multiple optical fibers, such as eight (8), twelve (12), and twenty-four (24) fiber configurations for datacenter applications or high-density multi-fiber arrays with MPOs of as many as seventy-two (72) fibers for large scale optical switch applications. Each of these MPO connectors may be subject to intermateability standards that specify the physical attributes of the connector, such as pin and guide hole dimensions for male and female interfaces, so as to ensure that any compliant transceivers, modules, and/or adapters may be intermated. MT ferrules refer to an optical standard that is designed within the MPO housing; however, other housing options are currently available for MT ferrules.

With regard to the high-performance computing standards described above, the InfiniBand® standard requires two (2) MT12 ferrules that each include four (4) channels where each channel includes two (2) fibers such that only eight (8) fibers of the available twelve (12) are used. In contrast, the Ethernet standard requires an MT16 ferrule that includes eight (8) channels where each channel includes two (2) fibers such that sixteen (16) channels are used. As such, traditional systems fail to provide devices that are operable with both the InfiniBand® standard and the Ethernet standard. By way of example, traditional systems often require separate, distinct housing or backshell designs that are only compliant with one of these standards resulting in costly manufacturing and cumbersome installation. Furthermore, these standard-specific backshell designs may require direct connections or interfacing with transceiver components. In applications in which sufficient clearance in not easily provided, these conventional components further burden the connection or installation process.

In order to address these issues and others, the devices of the present disclosure provide optical splitting adapters that utilize a single backshell design that is configured for use with transceivers of different types, channels, and the like. In particular, the optical splitting adapters and associated methods of manufacturing described hereafter are compliant with InfiniBand® and Ethernet standards so as to provide optical splitting between, for example, a single transceiver operating with sixteen (16) channels and two (2) or more transceivers each operating with, for example, four (4) channels. In doing so, the optical splitting adapters of the present disclosure provide an adaptable component for use with a diverse array of networking systems reducing manufacturing costs and facilitating component installation. Furthermore, the use of an optical splitting adapter of the present disclosure may remove the difficulties associated with component installation in limited clearance applications, such as in densely-packed fiber optic networking racks in which direct component connections are impossible or impracticable.

Optical Splitting Adapter

With reference to FIG. 1, an example networking connection 10 including an optical splitting adapter 100 is illustrated. As shown, the connection 10 may include a first optical transceiver 131c that operates at a first data rate, a second optical transceiver 131a that operates at a second data rate, and a third optical transceiver 131b that operates at a third data rate. By way of a particular example, the first optical transceiver 131c may operate at a data rate associated with or otherwise governed by applicable Ethernet standards, and the second optical transceiver 131a and the third optical transceiver 131b may operate at a data rate associated with or otherwise governed by applicable InfiniBand® standards. As such, the example networking connection 10 may utilize the optical splitting adapter 100 as shown in FIG.

1 and described hereafter with reference to FIGS. 2-6 to allow connection between these transceivers of different types. Although described hereinafter with reference to a second optical transceiver 131a and a third optical transceiver 131b that operate at a common or shared data rate, the present disclosure contemplates that the second data rate and the third data rate may differ or that the second data rate and/or the third data rate may be the same as the first data rate.

With continued reference to FIG. 1, the first optical transceiver 131c may be connected with the optical splitting adapter 100 at a first connector housing described hereafter via an optical cable 132c. The optical cable 132c may include an optical communication medium through which optical signals may be transmitted and may include MPO connectors on each end of the optical cable 132c. Furthermore, in an instance in which the first optical transceiver 131c complies with an Ethernet standard (e.g., is an Ethernet optical transceiver), the MPO connectors of the optical cable 132c may include an MT16 ferrule (e.g., a first type multi-fiber ferrule of a first number of fibers). As described hereafter, at least one MPO connector and MT16 ferrule of the optical cable 132c may comprise male MPO connectors so as to be received by a corresponding female MPO connector of the first connector housing of the optical splitting adapter 100.

The second optical transceiver 131a may be connected with the optical splitting adapter 100 at a second connector housing (e.g., at one of dual receptacles of the second connector housing) described hereafter via an optical cable 132a. The optical cable 132a may include an optical communication medium through which optical signals may be transmitted and may include MPO connectors on each end of the optical cable 132a. Furthermore, in an instance in which the second optical transceiver 131a complies with an InfiniBand® standard (e.g., is an InfiniBand® optical transceiver), the MPO connectors of the optical cable 132a may include an MT12 ferrule (e.g., a second type multi-fiber ferrule of a second number of fibers). As described hereafter, at least one MPO connector and MT12 ferrule of the optical cable 132a may comprise a male MPO connector so as to be received by a corresponding female MPO connector of the second connector housing of the optical splitting adapter 100 described hereafter.

The third optical transceiver 131b may similarly be connected with the optical splitting adapter 100 at the second connector housing (e.g., at the other of the dual receptacles of the second connector housing) described hereafter via an optical cable 132b. The optical cable 132b may include an optical communication medium through which optical signals may be transmitted and may include MPO connectors on each end of the optical cable 132b. Furthermore, in an instance in which the second optical transceiver 131b complies with an InfiniBand® standard (e.g., is an InfiniBand® optical transceiver), the MPO connectors of the optical cable 132b may include an MT12 ferrule similar to the second transceiver 131a. As described here after, at least one MPO connector and MT12 ferrule of the optical cable 132b may comprise a male MPO connector so as to be received by a corresponding female MPO connector of the second connector housing of the optical splitting adapter 100 described hereafter. In some embodiments, the second transceiver 131a and the third transceiver 131b may be InfiniBand® optical transceivers of the same number of optical transmission channels such that the MT12 ferrule of the optical cable 132b may also be a second type multi-fiber ferrule of a second number of fibers.

With reference to FIGS. 2-6, an example optical splitting adapter 100 is illustrated. As shown, the optical splitting adapter 100 may include a housing defined by an upper cover 101 and a mounting base 102. The upper cover 101 and mounting base 102 may, in combination, operate to at least partially enclose one or more of the networking components of the optical splitting adapter 100. Although illustrated as separable components, the present disclosure contemplates that the upper cover 101 and the mounting base 102 may be formed as an integral component. Furthermore, the present disclosure contemplates that the housing collectively formed by the upper cover 101 and the mounting base 102 may be dimensioned (e.g., sized and shaped) based upon the intended application of the optical splitting adapter 100 and based upon applicable industry regulations and standards.

The optical splitting adapter 100 may include a first connector housing 104 configured to interface with the first optical transceiver 131c having a first data rate. By way of continued example, the first connector housing 104 may be a female MPO connector configured to receive a corresponding male MPO connector of the optical cable 132c. Said differently, the first connector housing 104 may define a female MPO connector so as to provide physical engagement between the optical splitting adapter 100 and the optical cable 132c. In order to secure the optical cable 132c with the first connector housing 104, the first connector housing may define an attachment mechanism 110 (e.g., tabs, clamps, locking elements, or the like). Although described herein with reference to a female MPO connector, the first connector housing 104 may be dimensioned (e.g., sized and shaped) based upon the intended application of the optical splitting adapter 100 and based upon applicable industry regulations and standards.

Figure 3:
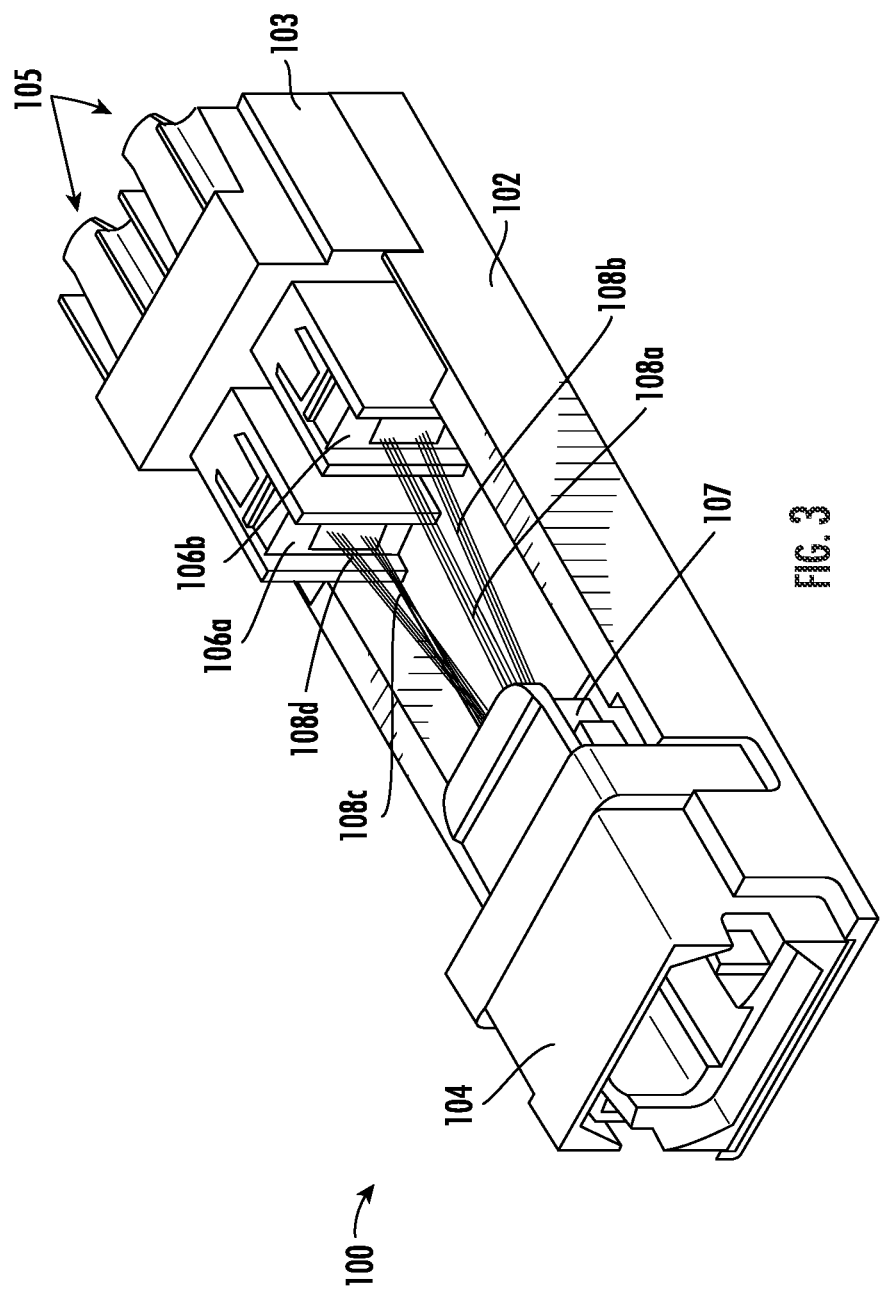
FIG. 3 illustrates a perspective interior view of the optical splitting adapter of FIG. 1 in accordance with some embodiments described herein.
Figure 4:
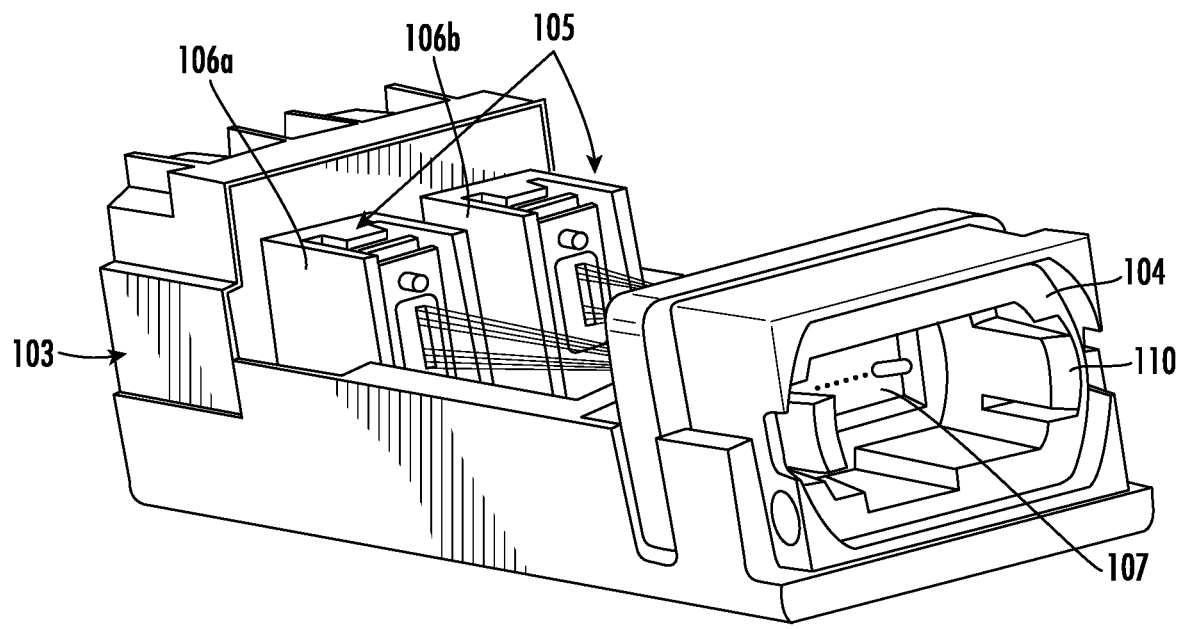
FIG. 4 illustrates a perspective view of a first connector housing of the optical splitting adapter of FIG. 1 in accordance with some embodiments described herein.
Figure 5:
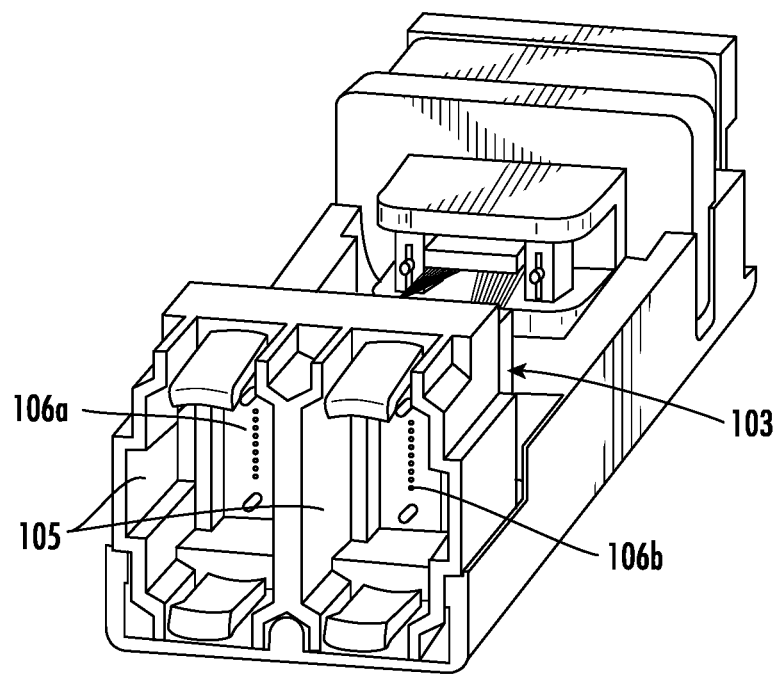
FIG. 5 illustrates a perspective view of a second connector housing of the optical splitting adapter of FIG. 1 in accordance with some embodiments described herein.
Figure 6:
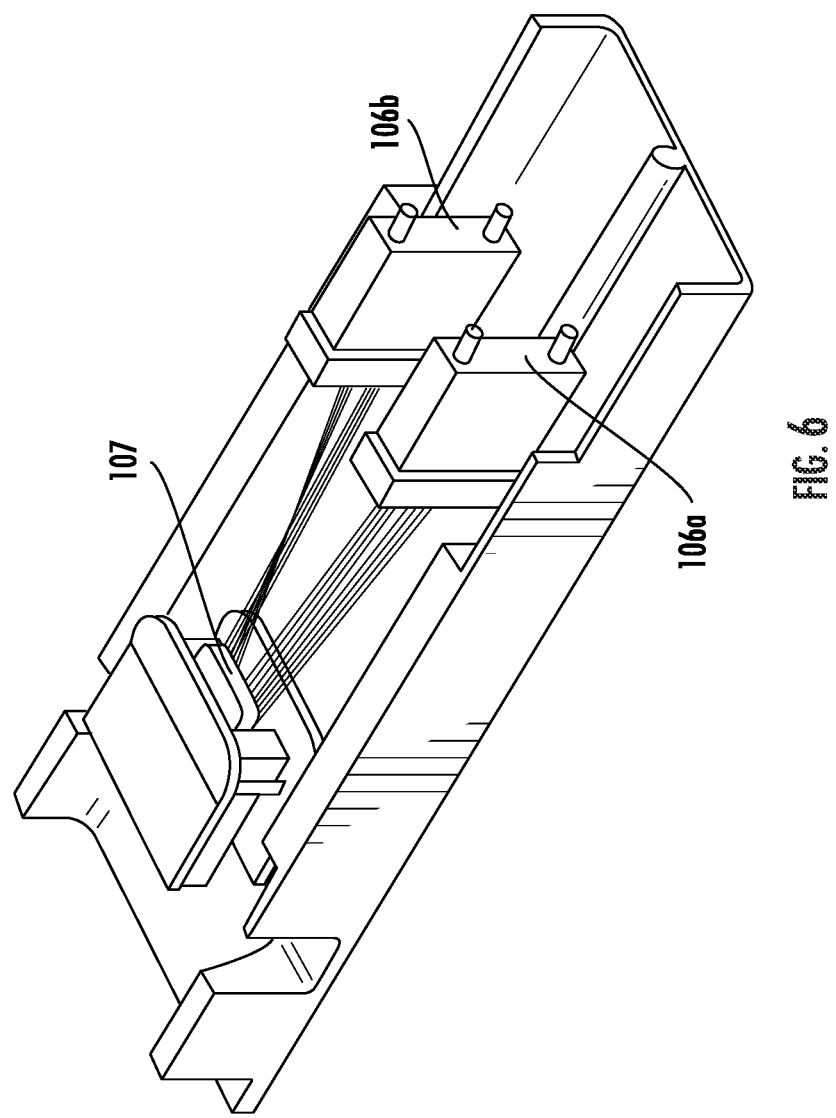
FIG. 6 illustrates the optical splitting adapter of FIG. 1 and associated mechanical transfer (MT) ferrules in accordance with some embodiments described herein.

The first connector housing 104 may further be configured to accommodate a first type multi-fiber ferrule of a first number of fibers. In an instance in which the optical splitting adapter 100 is configured as a female connection (e.g., a female MPO connector), the accommodation provided by the first connector housing 104 may refer to receipt of the first type multi-fiber ferrule of the first number of fibers at least partially within the first connector housing 104. As described above, the optical splitting adapter 100 may be configured to interface with an Ethernet optical transceiver (e.g., the first optical transceiver 131c), and the Ethernet standard may require the use of a multi-fiber ferrule of sixteen (16) fibers. By way of a particular example, the first multi-fiber ferrule may be an MT16 ferrule, and the first connector housing 104, as shown in FIGS. 3-4, may include an MT16 ferrule 107 configured to operably couple the optical splitting adapter 100 with a corresponding MT16 ferrule of the optical cable 132c such that optical communication between the MT16 ferrule (e.g., first multi-fiber ferrule 107) and the first transceiver 131c is established.

The optical splitting adapter 100 may include a second connector housing 103 that defines dual receptacles 105 configured to interface with the second optical transceiver 131a and the third optical transceiver 131b. As described above, the present disclosure contemplates that the second optical transceiver 131a and the third optical transceiver 131b may operate at different data rates and/or be of different types (e.g., subject to different industry standards). For the sake of ease of description, the dual receptacles 105 of the second connector housing 103 are described hereafter with reference to connection with a second optical transceiver 131a and a third optical transceiver 131b that are InfiniBand® optical transceivers.

By way of continued example, the second connector housing 103 may include dual receptacles 105, each of which may define a female MPO connector configured to receive a corresponding male MPO connector of the optical cables 132a, 132b. Said differently, the second connector housing 103 may define female MPO connectors so as to provide physical engagement between the optical splitting adapter 100 and the optical cable 131a and between the optical splitting adapter 100 and the optical cable 131b. Similar to the first connector housing 104, the second connector housing 103 may be dimensioned (e.g., sized and shaped) based upon the intended application of the optical splitting adapter 100 and based upon applicable industry regulations and standards. Furthermore, the optical splitting adapter 100 is described herein with reference to a second connector housing 103 with dual female MPO connectors. Similar to the first connector housing of the optical splitting adapter 120 described hereafter with reference to FIGS. 7-10, the present disclosure contemplates that one or more of the dual receptacles 105 of the second connector housing 103 may include a male MPO connector configured to be received by a corresponding female MPO connector of the respective optical cable 132a, 132b.

The dual receptacles 105 of the second connector housing 103 may be configured to receive a second type multi-fiber ferrule of a second number of fibers and/or a third type multi-fiber ferrule of a third number of fibers. As described above, the second optical transceiver 131a and the third optical transceiver 131b may be InfiniBand® optical transceivers such that the dual receptacles 105 are each configured to receive the second type multi-fiber ferrule of the second number of fibers. By way of continued example, the optical splitting adapter 100 may be configured to interface with InfiniBand® optical transceivers (e.g., the second and the third optical transceivers 131a, 131b), and the InfiniBand® standard may require the use of multi-fiber ferrules (e.g., MT12 ferrules) that include four (4) channels each having two (2) fibers. By way of a particular example, the second and third multi-fiber ferrules may be MT12 ferrules, and the second connector housing 103, as shown in FIGS. 3-6, may include MT12 ferrules 106a, 106b configured to operably couple the optical splitting adapter 100 with corresponding MT12 ferrules of the optical cables 132a, 132b such that optical communication between the MT12 ferrules (e.g., second multi-fiber ferrules 106a, 106b) and the second transceiver 131a and the third optical transceiver 131b is provided.

With continued reference to FIGS. 2-6, the optical splitting adaptor 100 may include a plurality of fibers 108 operably connecting the first connector housing 104 and the second connector housing 103. The plurality of fibers may include an optical communication medium configured to allow optical signals to pass between the first connector housing 104 and the second connector housing 103. In operation, the plurality of fibers 108 may be configured to perform optical splitting between the first type multi-fiber ferrule 107 of the first connector housing 104 and the multi-fiber ferrules 106a, 106b received by the dual receptacles 105 of the second connector housing 103. By way of example, the plurality of fibers 108 may include a first bundle of fibers 108a and a second bundle of fibers 108b extending between the first type multi-fiber ferrule 107 and one of the dual receptacles 105. The plurality of fibers 108 may also include a third bundle of fibers 108c and a fourth bundle of fibers 108d extending between the first type multi-fiber ferrule 107 and the other of the dual receptacles 105.

In operation, the first optical transceiver 131c (e.g., an Ethernet optical transceiver) may be operably connected to the optical splitting adapter 100 via a male MPO connector of the first optical cable 132c received by the female MPO connector defined by the first connector housing 104. An MT16 ferrule (e.g., a first type multi-fiber ferrule of a first number of fibers) of the first optical cable 132c may interface with a corresponding MT16 ferrule of the first connector housing 104 such that an optical signal may pass between the first optical transceiver 131c and the optical splitting adapter 100. The optical cable 132c may include sixteen (16) optical fibers operating as eight (8) optical communication channels as described hereafter with reference to FIG. 11A. The sixteen (16) optical fibers may, for example, include eight (8) fibers configured for transmitting (TX) optical signals from the first optical transceiver 131c, and eight (8) fibers for receiving (RX) optical signals directed to the first optical transceiver 131c.

The second transceiver 131a and the third transceiver 131b (e.g., InfiniBand® optical transceivers) may each be operably connected to the optical splitting adapter 100 via respective male MPO connectors of the second optical cable 132a and the third optical cable 132b received by the female MPO connectors defined by the dual receptacles 105 of the second connector housing 103. An MT12 ferrule (e.g., a second type multi-fiber ferrule of a second number of fibers) of the second optical cable 132a may interface with a corresponding MT12 ferrule of one of the dual receptacles 105 of the second connector housing 103 such that an optical signal may pass between the second optical transceiver 131a and the optical splitting adapter 100. An MT12 ferrule (e.g., a second type multi-fiber ferrule of a second number of fibers) of the third optical cable 132b may interface with a corresponding MT12 ferrule of the other of the dual receptacles 105 of the second connector housing 103 such that an optical signal may pass between the third optical transceiver 131b and the optical splitting adapter 100. Each of the optical cables 132a, 132b may include eight (8) optical fibers operating as four (4) optical communication channels as described hereafter with reference to FIGS. 11B-C. The eight (8) optical fibers of each optical cable 132a, 132b may, for example, include four (4) fibers configured for transmitting (TX) optical signals from the respective optical transceiver 131a, 131b, and four (4) fibers for receiving (RX) optical signals directed to the respective optical transceiver 131a, 131b.

The first bundle of fibers 108a and the second bundle of fibers 108b may extend between the first type (e.g., MT16) multi-fiber ferrule 107 of the first connector housing 104 to one of the second type (e.g., MT12) multi-fiber ferrule 106b of the second connector housing 103. As shown, the first bundle of fibers 108a and the second bundle of fibers 108b may each include four (4) optical fibers such that eight (8) of the transmission channels of the MT16 ferrule 107 are directed to the optical transceiver operably coupled with the receptacle 106b (e.g., the second optical transceiver 131a). The third bundle of fibers 108c and the fourth bundle of fibers 108d may also include four (4) optical fibers such that eight (8) of the transmission channels of the MT16 ferrule 107 are directed to the optical transceiver operably coupled with the receptacle 106a (e.g., the third optical transceiver 131b). As shown in FIGS. 11B-11C, the MT12 ferrules 106a, 106b may provide support for twelve (12) potential connections; however, in some embodiments of the present disclosure as shown, only eight (8) of the available twelve (12) connections are used. Said differently, the MT12 ferrules may be used to interface with MT16 ferrules by splitting eight (8) communication channels of sixteen (16) fibers from an Ethernet optical transceiver into at least two (2) InfiniBand® optical transceivers.

In this way, the optical splitting adapter 100 of the present disclosure may operate to provide connectivity for Ethernet optical transceivers and InfiniBand® optical transceivers with a common backshell or housing design. Furthermore, the use of the optical splitting adapter 100 removes potential difficulties associated with component installation in limited clearance applications, such as in densely-packed fiber optic networking racks in which direct connections are impossible or impracticable. Said differently, the connection between the optical splitting adapter 100 and the first optical transceiver 131c via the optical cable 132c avoids clearance related issues that may be present with direct adapter connections due to the industry-regulated dimensions associated with these networking components.

Figure 7:
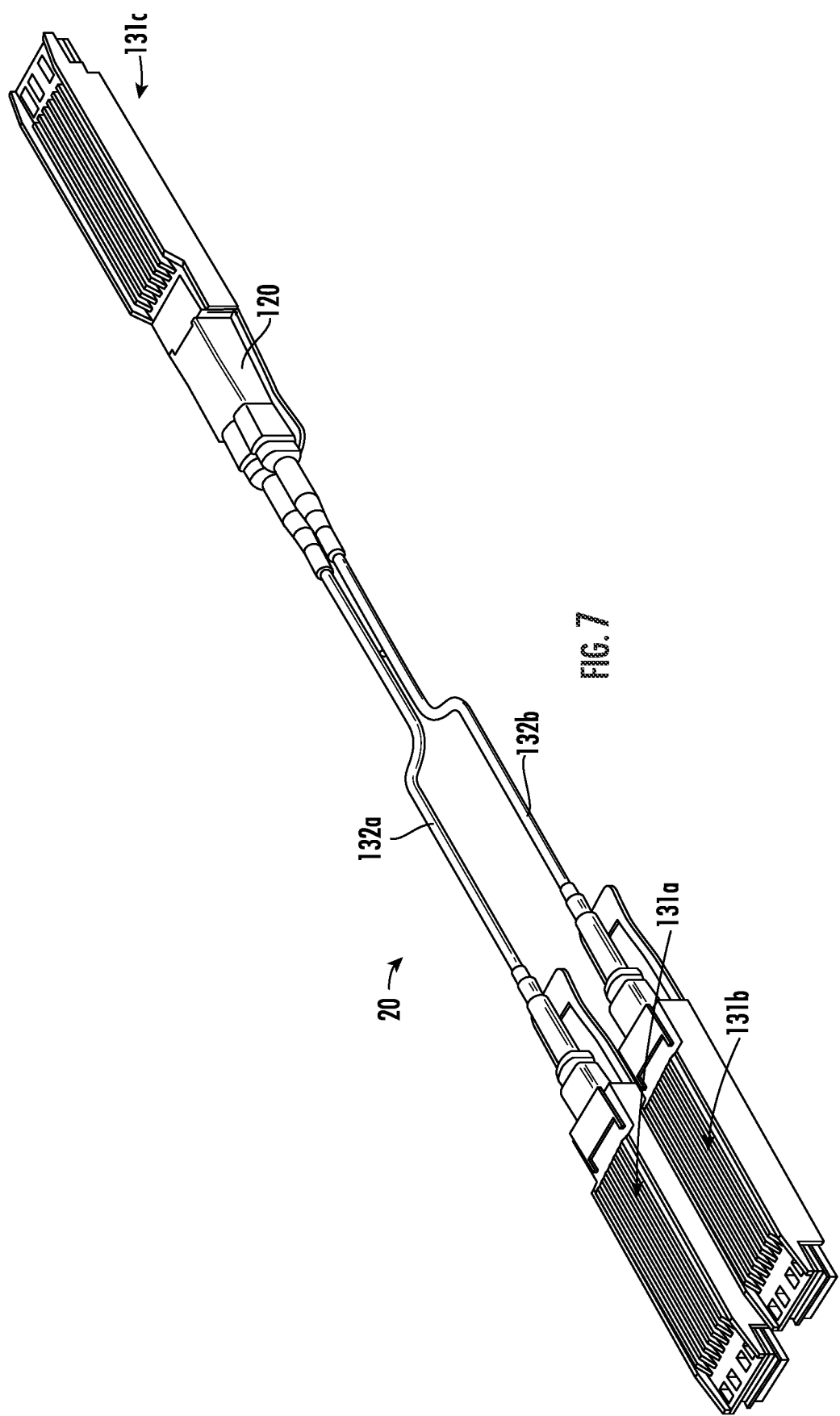
FIG. 7 illustrates an example networking connection including an optical splitting adapter defining a male connector in accordance with some embodiments described herein.

With reference to FIG. 7, an example networking connection 20 including an optical splitting adapter 120 is illustrated. As shown, the connection 20 may include the first optical transceiver 131c that operates at a first data rate, the second optical transceiver 131a that operates at the second data rate, and the third optical transceiver 131b that operates at the third data rate as described above with reference to FIG. 1. The optical splitting adapter 120 illustrated in FIG. 7, however, may include a first connector housing that defines a male connector (e.g., a male MPO connector) supporting the first type multi-fiber ferrule and configured to be received by the first optical transceiver 131c. In some embodiments, such as shown in connection 20, direct connection between the optical splitting adapter 120 and at least the first optical transceiver 131c is possible or otherwise practicable. In such an instance, the optical splitting adapter 120 may be used to provide optical communication between the first optical transceiver 131c and each of the second optical transceiver 131a and the third optical transceiver 131b.

Figure 8:
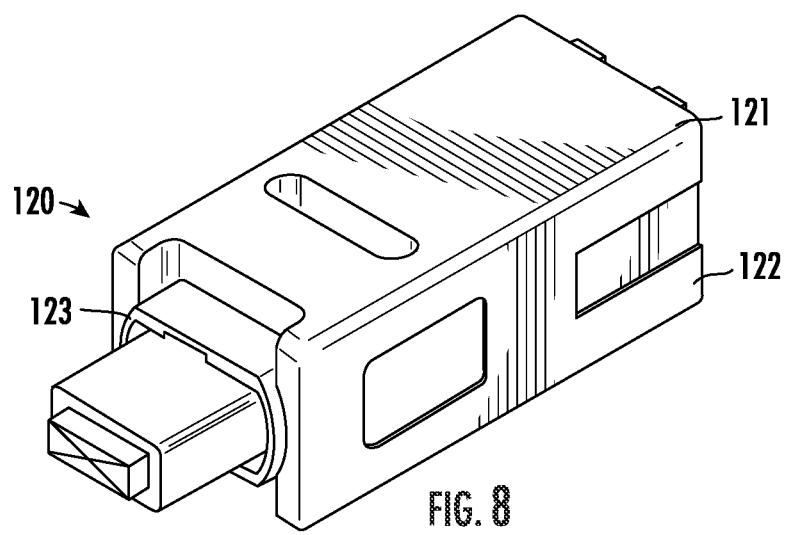
FIG. 8 illustrates a perspective exterior view of the optical splitting adapter of FIG. 7 in accordance with some embodiments described herein.
Figure 9:
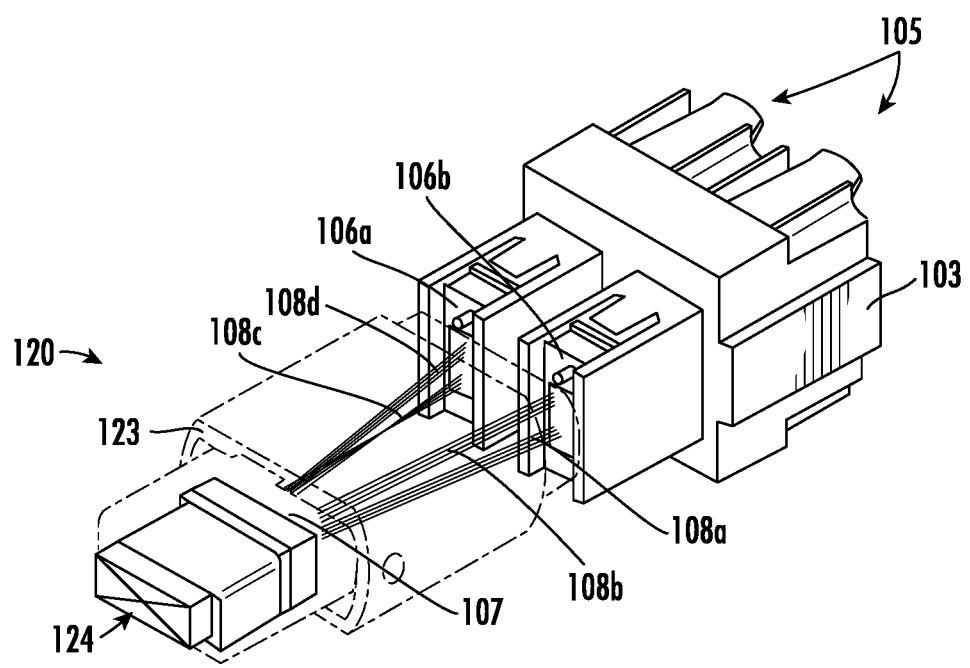
FIG. 9 illustrates a perspective view of a first connector housing of the optical splitting adapter of FIG. 7 in accordance with some embodiments described herein.
Figure 10:
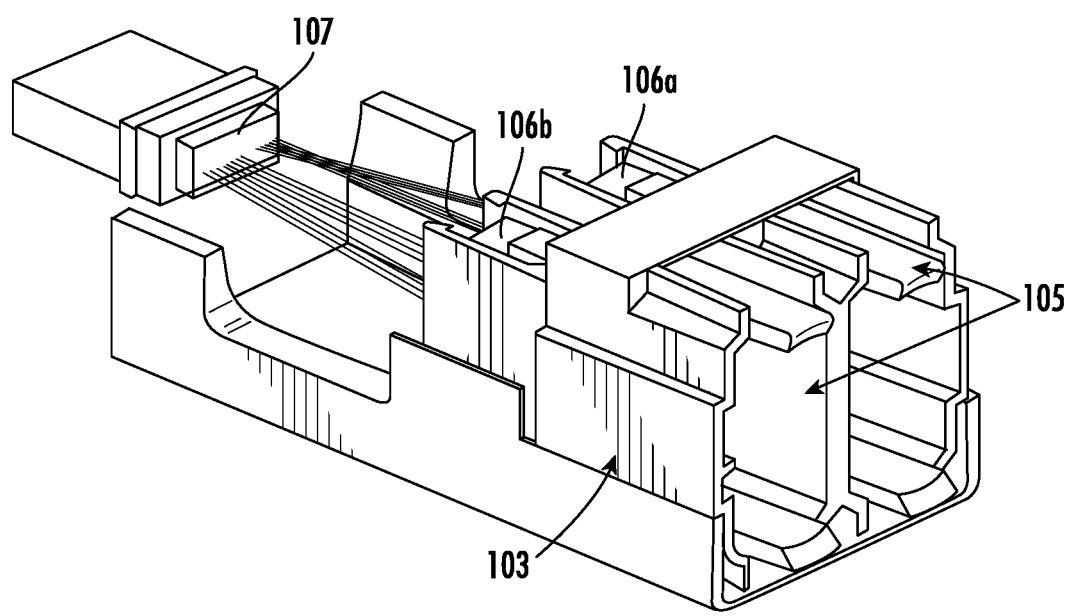
FIG. 10 illustrates a perspective view of a second connector housing of the optical splitting adapter of FIG. 7 in accordance with some embodiments described herein.

With reference to FIGS. 8-10, an example optical splitting adapter 120 that includes a male MPO connector 124 configured to be received by a corresponding female optical interface of an Ethernet optical transceiver (e.g., the first optical transceiver 131c) is shown. As shown, the optical splitting adapter 120 may include a housing defined by an upper cover 121 and a mounting base 122. The upper cover 121 and mounting base 122 may, in combination, operate to at least partially enclose one or more of the networking components of the optical splitting adapter 120. Although illustrated as separable components, the present disclosure contemplates that the upper cover 121 and the mounting base 122 may also be formed as an integral component. Furthermore, the present disclosure contemplates that the housing collectively formed by the upper cover 121 and the mounting base 122 may be dimensioned (e.g., sized and shaped) based upon the intended application of the optical splitting adapter 120 and based upon applicable industry regulations and standards.

The optical splitting adapter 120 may include the same components and configuration as the optical splitting adapter 100 with regard to the second connector housing 103, the dual receptacles 105, the first type (e.g., MT16) multi-fiber ferrule 107 of the first number of fibers, the second type (e.g., MT12) multi-fiber ferrules 106a, 106b of the second number of fibers, and the plurality of fibers 108. The first connector housing 123, however, may be configured to interface with the first optical transceiver 131c via a male MPO connector 124 configured to be received by a corresponding female MPO connector of the first optical transceiver 131c. Said differently, the first connector housing 123 may define a male MPO connector 124 that physically engages the first optical transceiver 131c.

In operation, the first optical transceiver 131c (e.g., an Ethernet optical transceiver) may be operably connected to the optical splitting adapter 120 by receiving a male MPO connector 124 of the optical splitting adapter 120 via a female MPO connector defined by the first optical transceiver 131c. As above, an MT16 ferrule 107 of the male MPO connector 124 may interface with a corresponding MT16 ferrule of the first optical transceiver 131c such that an optical signal may pass between the first optical transceiver 131c and the optical splitting adapter 120. The second transceiver 131a and the third transceiver 131b (e.g., InfiniBand® optical transceivers) may each be operably connected to the optical splitting adapter 120 via respective male MPO connectors of the second optical cable 132a and the third optical cable 132b received by the female MPO connectors defined by the dual receptacles 105 of the second connector housing 103. An MT12 ferrule (e.g., a second type multi-fiber ferrule of a second number of fibers) of the second optical cable 132a may interface with a corresponding MT12 ferrule of one of the dual receptacles 105 of the second connector housing 103 such that an optical signal may pass between the second optical transceiver 131a and the optical splitting adapter 100. An MT12 ferrule (e.g., a second type multi-fiber ferrule of a second number of fibers) of the third optical cable 132b may interface with a corresponding MT12 ferrule of the other of the dual receptacles 105 of the second connector housing 103 such that an optical signal may pass between the third optical transceiver 131b and the optical splitting adapter 100.

Figure 11A:
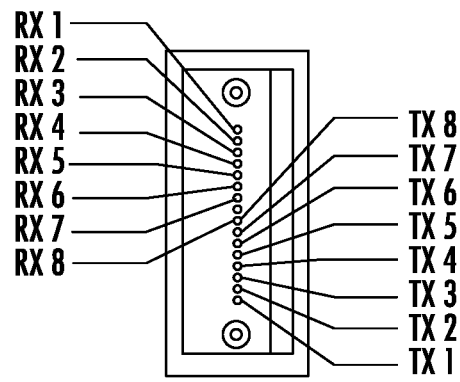
FIGS. 11A-C illustrate example fiber connection schematics for use with some embodiments described herein.
Figure 11B:
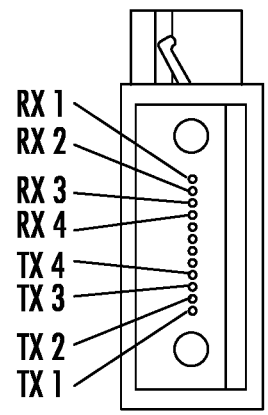
Figure 11C:
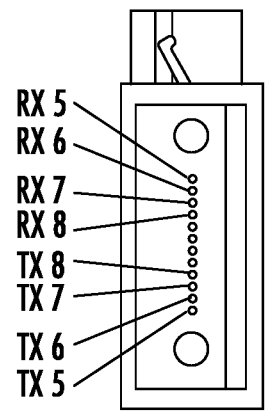

With reference to FIGS. 11A-11C, example fiber connection schematics are illustrated. As shown in FIG. 11A, an MT16 ferrule may include sixteen (16) optical fibers operating as eight (8) optical communication channels as described hereafter with reference to FIG. 11A. The sixteen (16) optical fibers may, for example, include eight (8) fibers configured for transmitting (TX) optical signals, and eight (8) fibers for receiving (RX) optical signals. As shown in FIGS. 11B-11C, MT12 ferrules may provide support for twelve (12) potential connections; however, in some embodiments of the present disclosure, only eight (8) of the available twelve (12) connections may be used. Said differently, the MT12 ferrules illustrated in FIGS. 11B-C may be used to interface with MT16 ferrules, via the optical splitting adapters 100, 120 described herein, by splitting eight (8) communication channels of sixteen (16) fibers from an Ethernet optical transceiver into at least two (2) InfiniBand® optical transceivers.

Example Methods of Manufacturing

Figure 12:
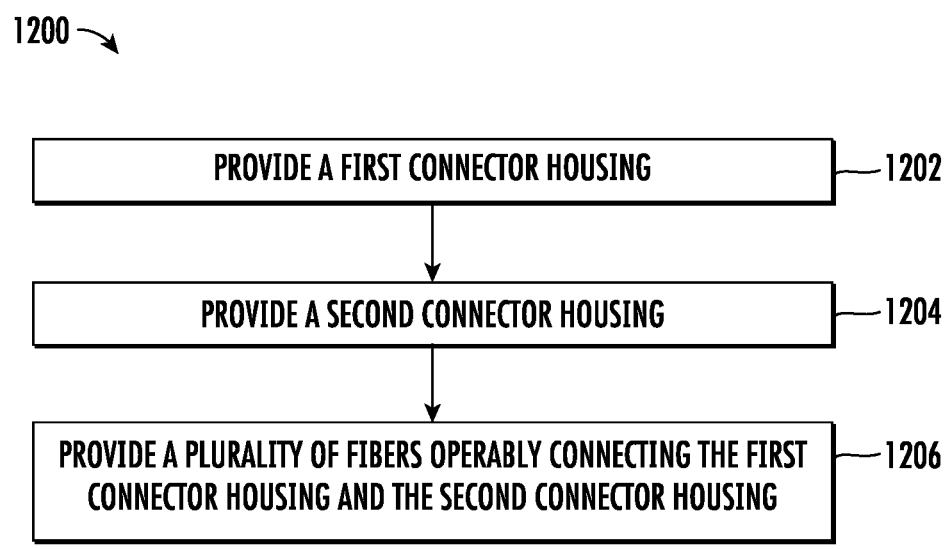
FIG. 12 is a flowchart illustrating a method of manufacturing an optical splitting adapter in accordance with some embodiments described herein.

With reference to FIG. 12, a method of manufacturing an optical splitting adapter is illustrated. The method (e.g., method 1200) may include the steps of providing a first connector housing at operation 1202. As described above, the first connector housing may be configured to interface with the first optical transceiver having a first data rate. In some instances, the first connector housing may be a female MPO connector configured to receive a corresponding male MPO connector of an optical cable communicably coupled with the first transceiver. In other embodiments, the first connector housing may be a male MPO connector configured to be received by a corresponding female MPO connector of the first optical transceiver. In order to secure the optical cable with the first connector housing, the first connector housing may define an attachment mechanism (e.g., tabs, clamps, locking elements, or the like).

The first connector housing may further be configured to accommodate a first type multi-fiber ferrule of a first number of fibers. As described above, the optical splitting adapter may be configured to interface with an Ethernet optical transceiver (e.g., the first optical transceiver), and the Ethernet standard may require the use of a multi-fiber ferrule of sixteen (16) fibers (e.g., an MT16 ferrule) such that the first connector housing may include an MT16 ferrule.

The method (e.g., method 1200) may include the steps of providing a second connector housing at operation 1204. As described above, the second connector housing may define dual receptacles configured to interface with a second optical transceiver and a third optical transceiver. The dual receptacles may each define a female MPO connector configured to receive a corresponding male MPO connectors of optical cables communicably coupled with the second optical transceiver and the third optical transceiver. The dual receptacles of the second connector housing may be configured to receive a second type multi-fiber ferrule of a second number of fibers and/or a third type multi-fiber ferrule of a third number of fibers. As described above, the second optical transceiver and the third optical transceiver may be InfiniBand® optical transceivers such that the dual receptacles are each configured to receive the second type multi-fiber ferrule of the second number of fibers (e.g., MT12 ferrules).

The method (e.g., method 1200) may include the steps of providing a plurality of fibers operably connecting the first connector housing and the second connector housing at operation 1206. As described above, the optical splitting adaptor may include a plurality of fibers operably connecting the first connector housing and the second connector housing. The plurality of fibers may include an optical communication medium configured to allow optical signals to pass between the first connector housing and the second connector housing. In operation, the plurality of fibers may be configured to perform optical splitting between the first type multi-fiber ferrule of the first connector housing and the multi-fiber ferrules received by the dual receptacles of the second connector housing. By way of example, the plurality of fibers 108 may include a first bundle of fibers and a second bundle of fibers extending between the first type multi-fiber ferrule and one of the dual receptacles. The plurality of fibers may also include a third bundle of fibers and a fourth bundle of fibers extending between the first type multi-fiber ferrule and the other of the dual receptacles.

Many modifications and other embodiments of the inventions set forth herein will come to mind to one skilled in the art to which these inventions pertain having the benefit of the teachings presented in the foregoing descriptions and the associated drawings. Although the figures only show certain components of the methods and systems described herein, it is understood that various other components may also be part of any optical component or optoelectronic element. In addition, the method described above may include fewer steps in some cases, while in other cases may include additional steps. Modifications to the steps of the method described above, in some cases, may be performed in any order and in any combination.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An optical splitting adaptor comprising:
   a first connector housing configured to interface with a first optical transceiver having a first data rate, wherein the first connector housing is configured to accommodate a first type multi-fiber ferrule of a first number of fibers;
   a second connector housing defining dual receptacles configured to operably connect with a second optical transceiver and a third optical transceiver, wherein each of the dual receptacles is configured to receive respective multi-fiber ferrules; and
   a plurality of fibers operably connecting the first connector housing and the second connector housing such that, in operation, the plurality of fibers are configured to perform optical splitting between the first type multi-fiber ferrule of the first connector housing and the multi-fiber ferrules received by the dual receptacles of the second connector housing,
   wherein the first optical transceiver comprises an Ethernet optical transceiver, and each of the second optical transceiver and the third optical transceiver are configured to interface with a multi-fiber push on (MPO) connector.

2. The optical splitting adapter according to claim 1, wherein the plurality of fibers further comprise:
   a first bundle of fibers and a second bundle of fibers extending between the first type multi-fiber ferrule and one of the dual receptacles; and
   a third bundle of fibers and a fourth bundle of fibers extending between the first type multi-fiber ferrule and the other of the dual receptacles.

3. The optical splitting adaptor according to claim 1, wherein a portion of the plurality of fibers are configured for data transmission and a portion of the plurality of the fibers are configured for data reception.

4. The optical splitting adaptor according to claim 1, wherein the second connector housing comprises a multi-fiber push on (MPO) connector.

5. The optical splitting adaptor according to claim 1, wherein each of the multi-fiber ferrules is a mechanical transfer (MT) ferrule.

6. The optical splitting adaptor according to claim 1, wherein the first connector housing comprises a female connector configured to receive the first type multi-fiber ferrule of the first optical transceiver.

7. The optical splitting adaptor according to claim 1, wherein the first connector housing comprises a male connector supporting the first type multi-fiber ferrule configured to be received by the first optical transceiver.

8. The optical splitting adaptor according to claim 1, wherein each of the dual receptacles is configured to receive a second type multi-fiber ferrule of a second number of fibers.

9. The optical splitting adaptor according to claim 8, wherein the first type multi- fiber ferrule comprises a mechanical transfer 16 (MT16) ferrule, and the second type multi-fiber ferrules each comprise a mechanical transfer 12 (MT12) ferrule.

10. The optical splitting adaptor according to claim 1, wherein:
    each of the dual receptacles of the second connector housing is configured to receive a male multi-fiber push on (MPO) connector of an optical cable communicably coupled with respective optical transceivers.

11. The optical splitting adaptor according to claim 10, wherein the first connector housing further comprises a male MPO connector configured to be received by a corresponding female optical interface of the Ethernet optical transceiver.

12. The optical splitting adaptor according to claim 10, wherein the first connector housing further comprises a female MPO receptacle configured to receive a male MPO connector of an optical cable communicably coupled with the Ethernet optical transceiver.

13. The optical splitting adaptor according to claim 1, wherein the second optical transceiver is configured to operate at a second data rate and the third optical transceiver is configured to operate at a third data rate.

14. The optical splitting adaptor according to claim 13, wherein the second data rate and/or the third data rate is the same as the first data rate.

15. A method of manufacturing an optical splitting adaptor, the method comprising:
providing a first connector housing configured to interface with a first optical transceiver having a first data rate, wherein the first connector housing is configured to accommodate a first type multi-fiber ferrule of a first number of fibers;
providing a second connector housing defining dual receptacles configured to operably connect with a second optical transceiver and a third optical transceiver, wherein each of the dual receptacles is configured to receive respective multi-fiber ferrules; and
providing a plurality of fibers operably connecting the first connector housing and the second connector housing such that, in operation, the plurality of fibers are configured to perform optical splitting between the first type multi-fiber ferrule of the first connector housing and the multi-fiber ferrules received by the dual receptacles of the second connector housing,
wherein the first optical transceiver comprises an Ethernet optical transceiver, and each of the second optical transceiver and the third optical transceiver are configured to interface with a multi-fiber push on (MPO) connector.

16. The method according to claim 15, wherein the first connector housing comprises a female connector configured to receive the first type multi-fiber ferrule of the first optical transceiver.

17. The method according to claim 15, wherein the first connector housing comprises a male connector supporting the first type multi-fiber ferrule configured to be received by the first optical transceiver.

18. The method according to claim 15, wherein:
each of the dual receptacles of the second connector housing is configured to receive a male multi-fiber push on (MPO) connector of an optical cable communicably coupled with respective optical transceivers.

19. The method according to claim 18, wherein the first connector housing further comprises a male MPO connector configured to be received by a corresponding female optical interface of the Ethernet optical transceiver.

20. The method according to claim 18, wherein the first connector housing further comprises a female MPO receptacle configured to receive a male MPO connector of an optical cable communicably coupled with the Ethernet optical transceiver.

* * * * *